United States Patent [19]

Rogers

[11] 4,262,061
[45] Apr. 14, 1981

[54] HIGH ENERGY ALKALINE STORAGE CELL SEPARATOR AND PROCESS FOR MAKING SAME

[75] Inventor: Howard H. Rogers, Culver City, Calif.

[73] Assignee: Hughes Aircraft Company, Culver City, Calif.

[21] Appl. No.: 914,461

[22] Filed: Jun. 12, 1978

[51] Int. Cl.² .................. H01M 2/16; H01M 12/06
[52] U.S. Cl. .................................... 429/27; 429/206; 429/251
[58] Field of Search .............. 429/251, 247, 248, 129, 429/27, 101; 106/57, 299; 139/425 R; 252/62.59

[56] References Cited

U.S. PATENT DOCUMENTS

| | | | |
|---|---|---|---|
| 3,021,379 | 2/1962 | Jackel | 429/247 X |
| 3,542,596 | 11/1970 | Arrance | 429/251 X |
| 3,625,770 | 12/1971 | Arrance et al. | 429/251 X |
| 3,647,554 | 3/1972 | Arrance et al. | 429/251 X |
| 3,713,890 | 1/1973 | Strier et al. | 429/251 X |
| 3,861,963 | 1/1975 | Arrance et al. | 429/251 |

Primary Examiner—Anthony Skapars
Attorney, Agent, or Firm—Booker T. Hogan, Jr.; William H. MacAllister

[57] ABSTRACT

High energy alkaline storage batteries exhibiting exceptionally long storage life are fabricated from cells which show no sign of deterioration after more than 3000 cycles at 80% depth of discharge. The exceptional characteristics of these cells are attributed to improved separators fabricated from zirconium oxide cloth reinforced with organic polymeric materials.

9 Claims, 5 Drawing Figures

HIGH ENERGY ALKALINE STORAGE CELL SEPARATOR AND PROCESS FOR MAKING SAME

FIELD OF THE INVENTION

This invention relates generally to alkaline storage batteries and more particularly to novel separators for these batteries and processes for making same.

BACKGROUND OF THE INVENTION

The use of electrode separation members or "separators" in multi-electrode storage batteries is generally well-known, and these separators have been used, for example, in alkaline storage batteries employed in lightweight high-energy aerospace applications. Various recent studies in this art have shown that a principal limitation on the ability to manufacture high energy alkaline storage batteries lies in the design of the battery separator.

Typical alkaline storage batteries which have been used in certain aerospace applications, i.e., batteries such as nickel-cadmium and the higher energy nickel-hydrogen ($NiH_2$) batteries, require separators which have at least several of the following characteristics: good chemical stability against the electroyte (generally an aqueous potassium hydroxide solution (KOH)), good mechanical strength, good wettability in the electrolyte, good electrolyte retention, good gas permeability through the battery separator, good electrolyte reservoir capability and a high melting point.

Previously, battery separators fabricated from materials such as asbestos, polypropylene, nylon, and various fibrous materials reinforced with polypropylene oxide, and zirconium oxide-yttrium oxide ceramic cloths have been used in space battery applications, but have not been found to be totally satisfactory in meeting many or all of the above described mechanical and electrical properties set forth with respect to separators for high energy nickel-cadmium and nickel-hydrogen batteries.

SUMMARY OF THE INVENTION

I have discovered and, therefore, developed a novel battery separator and process for fabricating same wherein the separator does, in fact, exhibit most, if not all, of the above desired characteristics for separators useful in nickel-hydrogen and nickel-cadmium cells while simultaneously overcoming most, if not all, of the major disadvantages associated with the above-identified prior art separator materials. My discovery is embodied in, among other things, a separator comprising a porous layer of zirconium oxide-yttrium oxide cloth having a polymer, such as polysulfone (PS), impregnated therein. This polymer may be selected from a group of polymers consisting of polysulfone, styrene-modified polyphenylene oxide, polyvinyl alcohol and acetylene substituted polyimides.

In a novel process embodiment of my invention, the separator is fabricated by providing a porous layer of zirconium oxide-yttrium oxide which has been impregnated with a selected polymer and interposing such porous layer between two larger layers of a selected filter paper. This latter sandwich structure is then inserted into a suitable blotting apparatus which includes absorbent material covered with an impervious film which functions as a capillary to getter excess polymer.

Accordingly, it is an object of the present invention to provide a new and improved separator suitable for use in high-energy light-weight storage battery applications.

Another object is to provide a porous oxide-polymer impregnated battery separator of the type described.

An additional object of this invention is to provide a high energy alkaline storage cell that exhibits a long life in an aerospace environment.

A further object of this invention is to provide a superior separator for use in the fabrication of alkaline storage cells and batteries.

A still further objective of this invention is to provide an organic polymeric material for reinforcing a known ceramic material in order to make it useful as a cell or battery separator and to provide a method for applying such a reinforcing material to the ceramic material while avoiding the disadvantages of prior art candidate battery separator materials.

DETAILED DESCRIPTION OF THE INVENTION

In seeking to achieve each of the above-stated objectives, while avoiding the disadvantages of the prior art, reinforcing polymeric materials exhibiting good chemical resistance to KOH, high thermal stability and adequate wetting characteristics were applied to a zirconium oxide-yttrium oxide cloth by a novel process which precluded the excessive migration of the polymeric material to the surface of the cloth thereby decreasing the wetting characteristics of the separator. This process provides a uniformly distributed polymeric coating throughout the cloth. Conventional "dip coat, air dry, and cure" impregnation processes, used to fabricate prior art reinforced composite materials, tend to result in a reinforced material having a polymer-rich surface layer or polymer film on the surface of the material.

In order to avoid this non-uniform impregnation of the Zircar cloth used in this invention, and obtain a separator having a uniform polymeric impregnation profile, a special solvent evaporation process is followed. Generally, the impregnating plastic or polymer is dissolved in a suitable solvent to make a solution of known concentration. In the case of polysulfone, a 5% solution was formed with ethylene dichloride. This solution may be further diluted with additional solvent as needed to achieve the described level of plastic in the cloth. Alternatively, a 4% solution of N,N-dimethylformamide may be used.

The plastic-solvent solution is then applied to the cloth, either by immersing the cloth in the solution or by pouring the diluted solution on the cloth.

Figure 1:
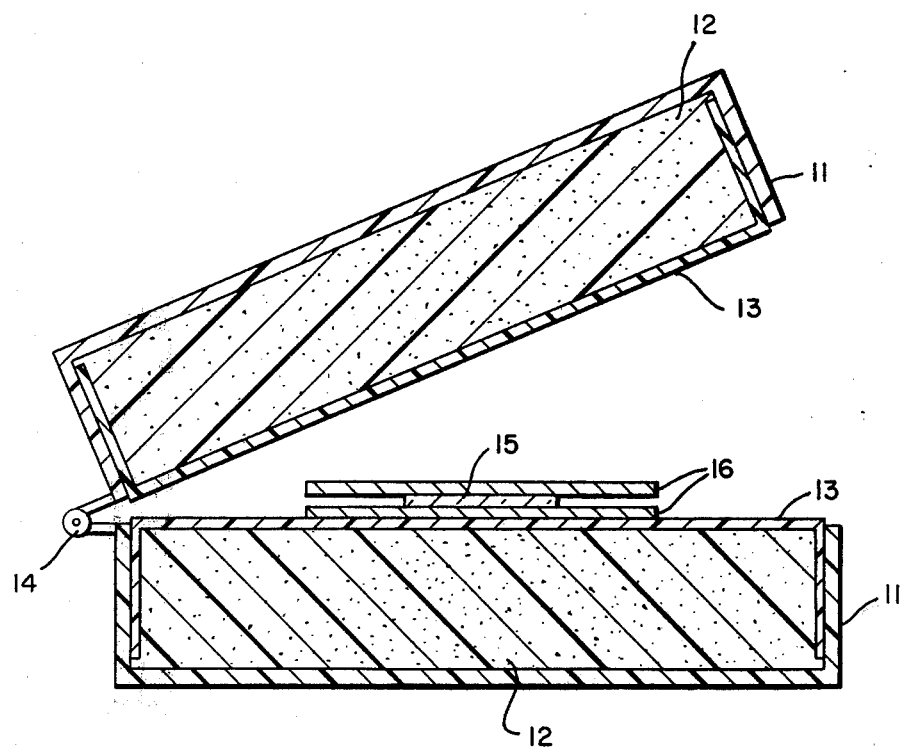
FIG. 1 is a schematic of a device for blotting excess impregnant from the separator substrate during manufacture.

Once the solution is applied, the excess must be removed by a blotting action. Nearly any absorbent material that is solvent resistant, such as a cellulose-base wiping tissue is suitable for this purpose. A specially designed blotting box (see FIG. 1) is utilized to preclude the Zircar from being damaged before the reinforcing effect of the PS is achieved. Referring now to FIG. 1, it will be seen that the blotting box consists of two sections 11 containing a resilient spongy material 12 coated with an impervious film 13, such as Teflon, connected together by a hinge 14 which facilitates the creation of a closed absorbent environment having evenly distributed drawing or capillary forces.

The impregnated material is then air dried. During this step, the material may be supported on a screen to minimize curling or hung in a vertical position.

In preparing the coating solution, one must select a suitable solvent for the polymer to be employed. Since PS is a relatively polar polymer, polar solvents are generally useful. Typical solvents suitable for the preparation of PS-Zircar-impregnated separators are methylene dichloride, ethylene dichloride, choloroform, tetrahydrofuran, dioxane, cyclohexanone, chlorobenzene and dimethylformamide.

Example I is an impregnation procedure that has been utilized to impregnate Zircar cloth with polysulfone. It may be used with slight variations to apply other suitable polymers to Zircar.

EXAMPLE I

1. Prepare a 4% polysulfone (PS) solution in dimethylformamide (DMF) by dissolving 4 grams of PS in 100 ml of DMF. Note: Handle DMF solutions in a well-ventilated hood and with protective gloves to avoid direct contact with your skin.

2. Immerse the Zircar cloth 15 into the PS solution in a proper size crystallizing dish or beaker. (There should be enough solution to cover the whole cloth.) Cover the dish with parafilm or aluminum foil to minimize the evaporation of the solution.

3. Place the dish with Zircar in an ultrasonic cleaner for 15 seconds to get rid of any air bubbles at the surface of the Zircar. (Note: This step may not be required.)

4. Allow at least 15 minutes for the Zircar to be soaked.

5. Take the Zircar out of solution using a pair of tweezers and drain the solution at the edge of the dish for a few seconds.

6. Place the Zircar over a four-ply layer of Kaydrys for 5 seconds; then flip the Zircar over and wait another 5 seconds.

7. Place the impregnated Zircar 15 between two layers of Whatman No. 41 filter paper 16 in a specially designated blotting box (see FIG. 1). Blot the solution out of the Zircar by closing the box for 30 seconds.

8. Transfer the Zircar quickly over a suspended polypropylene screen (e.g., E. I. Dupont's Vexar) over a rectangular frame which fits in a vacuum oven without touching the side walls. The polypropylene screen might be replaced by a metal screen provided that the screen is thermally insulated from the floor and walls of the vacuum oven.

9. Transfer the frame with the screen and Zircar quickly into the preheated vacuum oven at 100° C. and evacuate the oven quickly (alternatively a vented air circulating oven may be used). Steps 8 and 9 combined should not consume more than 0.5 to 1 minute of time to be completed.

10. Leave the Zircar in the oven for 3-4 hours to insure complete dryness.

The impregnation process of this invention facilitates the incorporation of the reinforcing polymeric material (not shown) into the unimpregnated cloth. When the cloth is impregnated with polysulfone, the reinforcing material or impregnant is invisible to the eye even when aided with a scanning electron microscope (SEM).

The selection of candidate polymeric materials for use as reinforcing agents was constrained by several limitations. The most important is the requirement of good chemical resistance to alkaline KOH electrolyte solutions. Other constraints such as heat resistance, wettability, good mechanical strength and flexibility combined with the primary constraint of chemical resistance tended to limit the number of candidate materials. For example, epoxy resins were not suitable because Zircar cloths reinforced with these resins did not exhibit increased strengths and most hydrocarbon polymers exhibit relatively low melting points and/or are not adequately chemically resistant to KOH. Therefore, they are generally not believed to be useful as reinforcing agents for Zircar intended for use as a battery separator. Polymers which may be otherwise suitable are not soluble in solvents and are therefore impossible to apply to Zircar. Typical materials falling within this group are polyphenylene sulfide polymers.

The search for suitable resins led to the selection of aromatic hydrocarbons, such as "Noryl" (a styrene modified polyphenylene oxide), polysulfone (PS), polyvinyl alcohol (PVA) and acetylenic substituted polyimides (API). While each of these materials tend to be useful, in that they substantially improve the structural characteristics of the unimpregnated Zircar cloth, some were found to be more suitable than others. While there was a decrease in fragility observed by impregnating Zircar with Noryl, logistics problems in obtaining pure material limited our investigation of this material.

Acetylenic terminated polyimides, while probably useful, were not extensively evaluated because of their high cost and lack of availability on a commercial basis. However, these materials are highly thermal resistant, and exhibit excellent structural strengths while tending to be rather stiff.

Separators fabricated from Zircar cloth impregnated with polysulfone exhibited very good structural characteristics and high temperature resistance. Impact tests, carried out by dropping a 19 gram weight on an anvil of 11 grams with an area of 1.6 $cm^2$ over distances of 30 and 63 cm, show that impregnation levels of 2% polysulfone per weight of Zircar result in a material which withstands the full 63 cm drop test with flattening of the impact area without loss of fibers.

The electrical resistance of a heat damaged 2% sulfone-impregnated Zircar separator was measured by heating the sample in nitrogen to a red heat until fully carbonized. Measurements of the electrical resistance through this separator over a one $cm^2$ area showed a resistance of greater than $10^7$ ohms, a completely negligible leakage for the area measured. Thus a hydrogen-oxygen localized burn, which has caused shorts with a nylon separator, does not damage the polysulfone-impregnated Zircar separator.

Referring to FIGS. 2-7, a nickel hydrogen cell 20 with 2% polysulfone-impregnated zirconium oxide separators 21 interposed between positive and negative electrode assemblies was assembled and is still running. This cell has completed over 3,000 cycles at 80% depth of discharge (DOD) in a 90-minute cycle without showing signs of deterioration. This result is substantially superior to that of prior art NI-H$_2$ cells having asbestos separators which begin to deteriorate significantly between 400 and 1,000 cycles at an 80% DOD in a 90-minute cycle.

Figure 2:
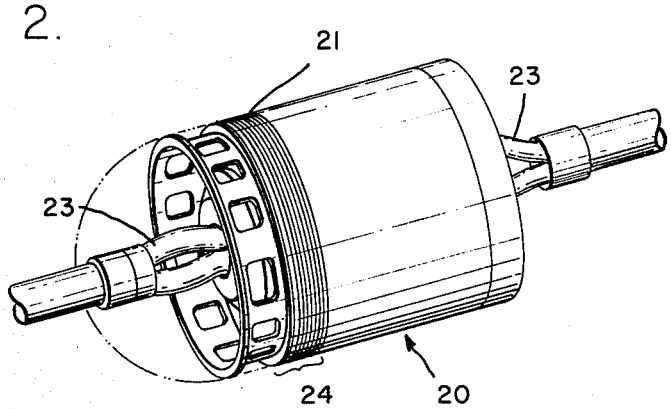
FIG. 2 is an overall plan view of an alkaline storage battery.
Figure 3:
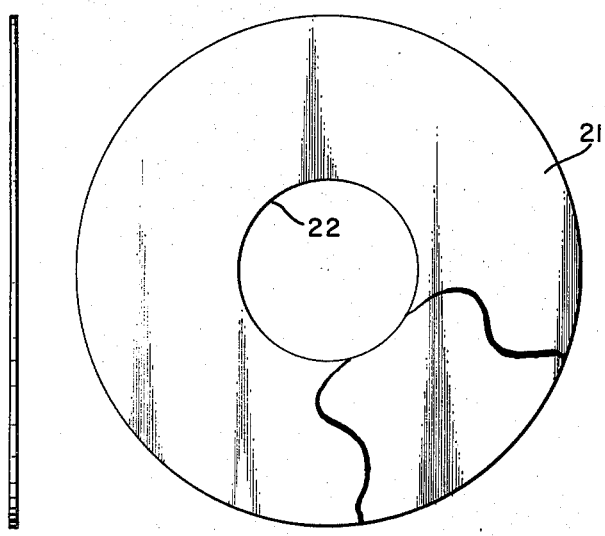
FIG. 3 is a top view of a separator suitable for use in a storage battery.
Figure 4:
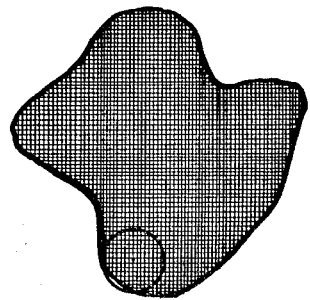
FIG. 4 is an enlarged view of a segment of the separator showing its crosshatch design.
Figure 5:
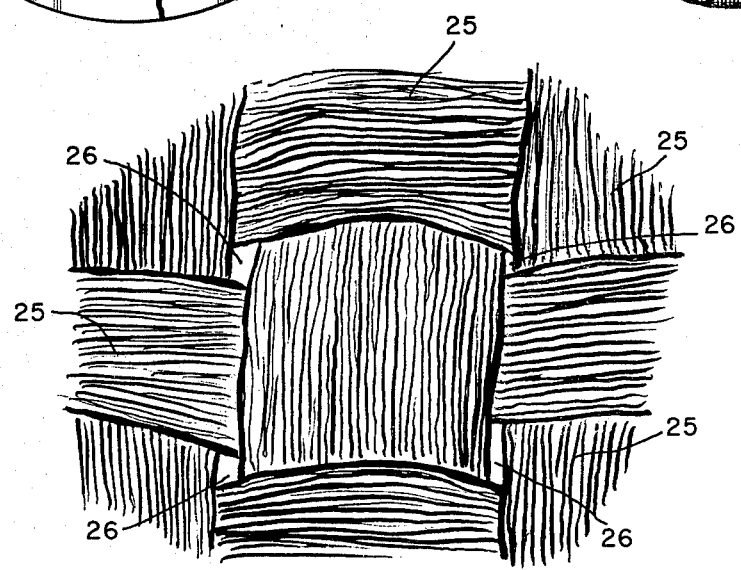
FIG. 5 presents an expanded view of FIG. 3 which further shows the crosshatch design of the fibrous mat, the arrangement of individual fibers and the interstices between fibers running in different directions.

A typical separator design utilized in the invention is shown in FIGS. 3, 4 and 5. FIG. 3 shows a cylindrically shaped separator 21 whose thickness ranges from 0.013 inches to 0.015 inches. Referring further to FIGS. 2 and 3, a cylindrical aperture 22 is provided to facilitate the connection of leads 23 running from electrodes within a repetitive stack or electrode assembly 24 maintained in a spaced relationship with respect to each other by the separators 21 of the electrode assembly 24.

FIG. 4 is an expanded view of a section of FIG. 3 which shows the square patch design that is an inherent characteristic of the unimpregnated Zircar cloth. A highly magnified view of the separator is shown in FIG. 5. Here, the cloth having individually impregnated and coated fibers 25 can be seen to have interstices 26 which facilitate electrolyte retention, and allow oxygen to flow between the electrodes.

Separators 21 prepared in accordance with this invention may then be used to form repetitive stack sets of positive and negative electrode assemblies 24. For example, preferred cylindrically shaped multiple back-to-back electrode assemblies or repetitive sets, comprising a gas screen, a single negative electrode, a separator, a double positive electrode assembly, a second separator and a double negative electrode assembly consisting of two single negative electrodes (joined by a single lead tab which extends into an aperture located in the center of the electrodes (not shown)) that are maintained in a spacial relationship with respect to each other by a gas screen are assembled such that each element is contiguous with the other.

The positive electrode assemblies utilized in the invention are fabricated from impregnated nickel plaque bonded to a nickel substrate. Negative electrode assemblies fabricated from a fuel grade platinum block bonded to porous Teflon are also mounted onto a nickel substrate. The techniques used to fabricate electrode assemblies suitable for use in NiH$_2$ cells are generally known.

The electrodes of each assembly are connected in parallel by leads 23 (see FIG. 2) which run through apertures located in the center of each element of the repetitive stacks.

When one considers that the primary distinction between the porous separators utilized in prior art alkaline storage batteries or cells and the separators of this invention lies in the use of specific polymeric materials to reinforce a known ceramic material, and thereby enable it to be utilized as a separator, the distinction between the operating characteristics of the prior art batteries and batteries fabricated via the present invention is truly phenominal. Prior art cells, while similar to cells of the present invention in their basic design, are incapable of sustained operations at high discharge rates in a low earth orbit.

A portion of this improvement, notwithstanding the ingenious selection of the proper materials, lies in the novel process utilized to apply the reinforcing polymeric material in the ceramic cloth.

Having completely disclosed how to make my novel seperator and how to use it in a novel high energy alkaline storage cell, the scope of my claims may now be understood as follows:

What is claimed is:

1. In a nickel-hydrogen alkaline storage cell containing positive and negative electrode assemblies, an alkaline electrolyte and electrical leads connecting the electrodes in said assemblies in parallel, an improvement comprising the utilization of inorganic-organic composite separators between said electrode assemblies fabricated from a porous ceramic cloth substrate reinforced with a thermally stable resin selected from the group of aromatic hydrocarbons consisting of polysulfone, styrene modified polyphenylene oxide, polyvinyl alcohol and acetylenic substituted polyimides which has been uniformally impregnated throughout said cloth which retains said electrolyte and promotes the flow of ions and gases between said electrode assemblies.

2. The improvement of claim 1 wherein said ceramic cloth is a zirconium oxide yttrium oxide, cloth.

3. The improvement of claim 1 wherein said separators are polysulfone impregnated zirconium oxide-yttrium oxide cloth has a woven patchwork design with evenly distributed interstices throughout which facilitate the flow of ions and gases while retaining electrolyte solutions between said electrode assemblies.

4. A separator suitable for use in nickel-hydrogen storage cells which facilitates continuous operations in a low earth orbit cycle comprised of a porous ceramic cloth substrate reinforced with a thermally stable resin selected from the group of aromatic hydrocarbons consisting of polysulfone, styrene modified polyphenylene oxide, polyvinyl alcohol and acetylenic substituted polyimides uniformally impregnated throughout said cloth.

5. The separator of claim 4 wherein said substrate is a woven zirconium oxide-yttrium oxide cloth having a patchwork design.

6. The separator of claim 5 wherein said resin is a polysulfone resin.

7. A battery separator for use as an electrolyte-containing medium between adjacent battery electrodes, said separator comprising a porous ceramic cloth substrate impregnated with a thermally stable, alkaline resistant reinforcing resin selected from the group consisting of polysulfone, styrene-modified polyphenylene oxide, polyvinyl alcohol and acetylene substituted polyimides.

8. The separator defined in claim 7 wherein said substrate is a mixture of zirconium oxide and yttrium oxide.

9. The separator of claim 8 wherein said resin is polysulfone.

* * * * *